United States Patent
Conte et al.

(10) Patent No.: US 7,403,405 B2
(45) Date of Patent: Jul. 22, 2008

(54) LOW-CONSUMPTION REGULATOR FOR A CHARGE PUMP VOLTAGE GENERATOR AND RELATED SYSTEM AND METHOD

(75) Inventors: Antonino Conte, Tremestieri Etneo (IT); Enrico Castaldo, Catania (IT)

(73) Assignee: STMicroelectronics, S.r.l., Agrate Brianza (MI) (IT)

( * ) Notice: Subject to any disclaimer, the term of this patent is extended or adjusted under 35 U.S.C. 154(b) by 12 days.

(21) Appl. No.: 10/877,063

(22) Filed: Jun. 24, 2004

(65) Prior Publication Data
US 2005/0030771 A1 Feb. 10, 2005

(30) Foreign Application Priority Data
Jun. 24, 2003 (EP) .................................. 03425404

(51) Int. Cl.
*H02M 3/18* (2006.01)
(52) U.S. Cl. .................................................. 363/59
(58) Field of Classification Search ......... 327/534–536; 363/59, 60; 257/299
See application file for complete search history.

(56) References Cited
U.S. PATENT DOCUMENTS

| | | | |
|---|---|---|---|
| 6,160,440 A * | 12/2000 | Javanifard et al. ........... | 327/536 |
| 6,259,612 B1 | 7/2001 | Itoh | |
| 6,278,317 B1 * | 8/2001 | Hsu et al. ..................... | 327/536 |
| 6,456,153 B2 * | 9/2002 | Buck et al. ................... | 327/536 |
| 6,531,902 B1 | 3/2003 | Tennen et al. | |
| 6,531,913 B1 * | 3/2003 | Ross .......................... | 327/536 |
| 6,774,709 B2 * | 8/2004 | Castaldo et al. ............. | 327/536 |
| 6,927,441 B2 * | 8/2005 | Pappalardo et al. ......... | 257/299 |
| 2001/0038543 A1 | 11/2001 | Buck et al. | |
| 2002/0068957 A1 | 6/2002 | Wolfe et al. | |
| 2003/0038667 A1 | 2/2003 | Imamiya | |

FOREIGN PATENT DOCUMENTS
EP 03425404 12/2003
JP 09016629 9/1997

* cited by examiner

*Primary Examiner*—Matthew V Nguyen
(74) *Attorney, Agent, or Firm*—Graybeal Jackson Haley LLP (57) ABSTRACT

A regulator circuit for a charge pump voltage generator includes a voltage comparator circuit that performs a voltage comparison between a charge pump output voltage and a reference voltage. A circuit responsive to the voltage comparator circuit conditions a charge pump clocking to the result of the voltage comparison. The voltage comparator circuit includes a sampling circuit for sampling the charge pump output voltage at a sampling rate. A sampling rate control circuit is responsive to the voltage comparisons for controlling the sampling rate according to the result of the voltage comparison.

34 Claims, 4 Drawing Sheets

LOW-CONSUMPTION REGULATOR FOR A CHARGE PUMP VOLTAGE GENERATOR AND RELATED SYSTEM AND METHOD

This application claims priority from European patent application No. 03425404.5, filed Jun. 24, 2003, which is incorporated herein by reference.

TECHNICAL FIELD

The present invention relates in general to charge pump voltage generators, which are circuits capable of generating, from a starting voltage, e.g. a supply voltage, prescribed positive or negative voltages different from the starting voltage. In particular, the present invention concerns a regulator circuit for controlling a charge pump voltage generator.

BACKGROUND

In the field of electronics, charge pump voltage generators, hereinafter simply referred to as charge pumps, have several applications.

Charge pumps are particularly useful in integrated circuits. For example, in electrically programmable and electrically erasable and programmable semiconductor memories such as EPROMs, EEPROMs and Flash memories, integrated charge pumps are provided for generating the voltages required for carrying out the read, write and erase operations on the memory cells. In particular, the relatively high positive and negative voltages required for writing and erasing the memory cells, typically ranging from 12 to 15 V, are generated starting from supply voltages of 3 V or less.

A charge pump comprises a plurality of stages connected in cascade between a supply voltage rail (typically, the supply voltage VDD of the integrated circuit) and a charge pump output. Each stage is capable of receiving electric charge from a previous stage or from the supply voltage rail, storing the electric charge in a charge-storage element, typically a capacitor, and transferring the electric charge to a following stage. The output of the last stage forms the charge pump output. The operation of the charge pump stages is controlled by properly out-of-phase timing signals, generally referred to as phases, which are generated by a phase generator starting from a base clock signal, generated for example by an oscillator circuit, or received from outside the integrated circuit.

In some applications, the voltages generated by the charge pumps should be highly stable irrespective of the current sunk from the charge pump. This is for example the case of the write/erase voltages for electrically alterable semiconductor memories, wherein the current sunk from a charge pump may easily reach the tens or even hundreds of μA. In particular, it is extremely important that the charge pump output voltages do not exceed prescribed safety levels, not to cause permanent damages to the tiny oxides forming the gates of the transistors and the dielectric of integrated capacitors. Unfortunately, charge pumps are, as known, far from being ideal voltage generators, because, due to their relatively high output impedance, the charge pump output voltages are greatly affected by the amount of current sunk therefrom.

For these reasons, charge pumps are normally equipped with regulator circuits that control the charge pump operation in such a way as to ensure that the output voltages are kept stable irrespective of the current sunk.

A conventional charge pump regulator typically comprises a voltage comparator circuit, for comparing the charge pump output voltage to a precisely known and stable reference voltage, generated for example by a band-gap reference voltage generator. The voltage comparator drives a control circuit that is adapted to condition the transmission of the clock signal to the phase generator. If the comparison performed by the voltage comparator reveals that the charge pump output voltage exceeds (in absolute value) a target voltage, equal to or derived from the reference voltage, the control circuit blocks the transmission of the clock signal pulses to the phase generator, thereby causing the charge pump to temporarily stop working (i.e., stop transferring electric charge between stages); the charge pump output voltage thus tends to decrease (in absolute value), due to the current absorbed by the charge pump load and to inevitable leakages. On the contrary, when the charge pump output voltage falls below the target voltage, the voltage comparator switches and the control circuit allows again the transmission of clock signal pulses to the phase generator; the charge pump is restarted.

The feedback nature of this voltage regulation scheme allows reaching a dynamic equilibrium condition, in which the charge pump output voltage is kept substantially equal to the target voltage. Once the output voltage has reached the target voltage, the charge pump is substantially turned off; in this way, when the charge pump works in an unloaded condition, the power consumption is significantly reduced, because it is only necessary to compensate for the leakages associated with the charge pump output. When instead a load is connected to the charge pump output, the regulator causes the charge pump to work at a rate that is exactly equal to what is needed for compensating the current sunk by the load (and, of course, the leakage current, which is however several orders of magnitude lower than the current sunk by the load).

Typically, the voltage comparator included in the charge pump regulator comprises a resistive voltage divider, to which the charge pump output voltage is applied, for deriving therefrom a precisely known percentage thereof, i.e. a suitable down-scaled value that is comparable to the band-gap reference voltage. This down-scaled charge pump output voltage is fed to a comparator, together with the reference voltage. The precision of the voltage regulator largely depends on the capability of the intermediate tap of the resistive voltage divider of rapidly tracking the variations in the charge pump output voltage. In order to compensate for effects caused by parasitics associated with the integrated resistors making up the resistive divider, shunt capacitors are provided in parallel to the resistors.

The conventional charge pump regulators work satisfactorily well, but have a non-negligible current consumption (current consumption levels of the order of 5 -10 μA are typical. Such a current consumption does not pose problems in normal operating conditions when the charge pump has to deliver several tens or hundreds of μA, but it is unacceptably high in case a stand-by operation is envisaged.

In fact, in order to shorten the time necessary for an integrated circuit, for example a semiconductor memory, to return from a stand-by condition to the normal operating condition, the charge pump or pumps integrated therein are preferably kept in a working condition even when the integrated circuit is put in stand-by.

However, the power consumption requirements in stand-by are normally quite strict, and the relatively high current absorbed by the charge pump regulator cannot be tolerated. In order to reduce the current absorbed by the charge pump regulator, very large resistance values should be adopted in the resistive voltage divider, which means large silicon area and slow response to variations in the charge pump output voltage.

Summarizing, the conventional charge pump regulators, which perform satisfactorily in normal operating conditions, are rather power-consuming and are not well adapted to the operation in stand-by conditions.

SUMMARY

In view of the state of the art outlined, an embodiment of the present invention provides a charge pump regulator featuring a low consumption; in particular, this embodiment provides a charge pump regulator having so low a consumption as to be adapted to the use even in stand-by operating conditions.

Briefly, according to an embodiment of present invention, the voltage regulator comprises a voltage comparator means for performing a voltage comparison between a charge pump output voltage and a reference voltage, and means responsive to the voltage comparator means for conditioning a charge pump clocking to the result of the voltage comparison.

The voltage comparator means includes sampling means for sampling the charge pump output voltage at a sampling rate.

Sampling rate control means are provided, responsive to the voltage comparison, for controlling the sampling rate according to the result of the voltage comparison.

BRIEF DESCRIPTION OF THE DRAWINGS

Features and advantages of the present invention will be made apparent by the following detailed description of an embodiment thereof, provided merely by way of non-limitative example, which will be conducted making reference to the annexed drawings, wherein.

DETAILED DESCRIPTION

Figure 1:
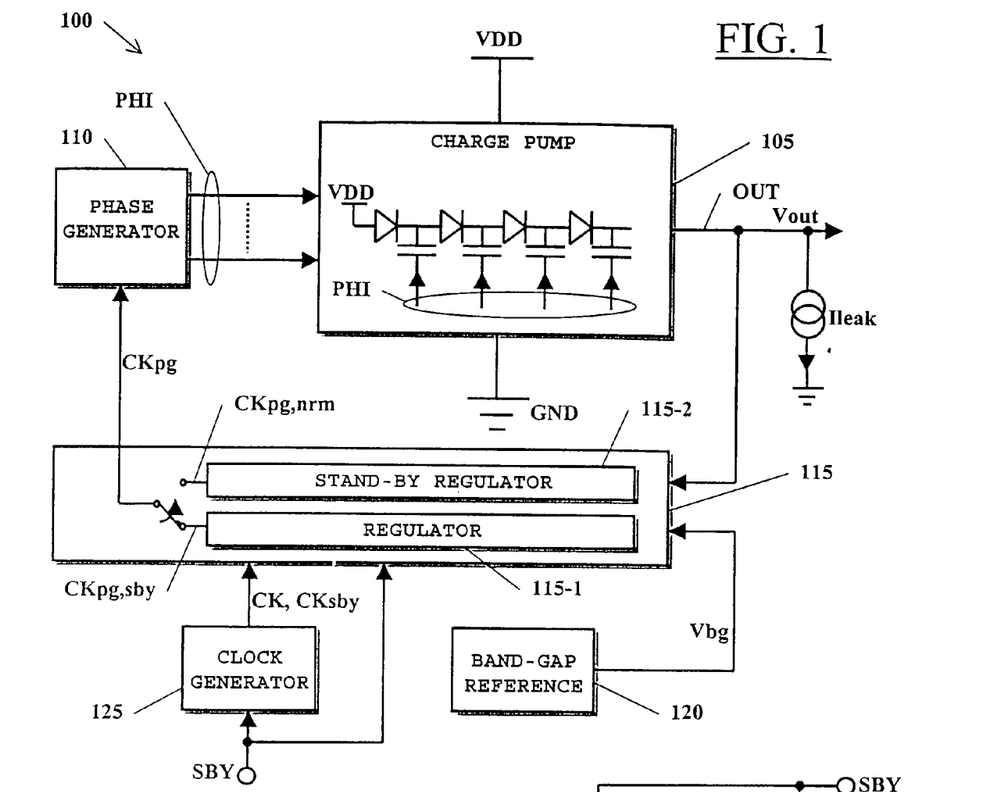
FIG. 1 is a schematic, functional block diagram of charge pump voltage generator with an output voltage regulation arrangement, according to an embodiment of the present invention.
Figure 2:
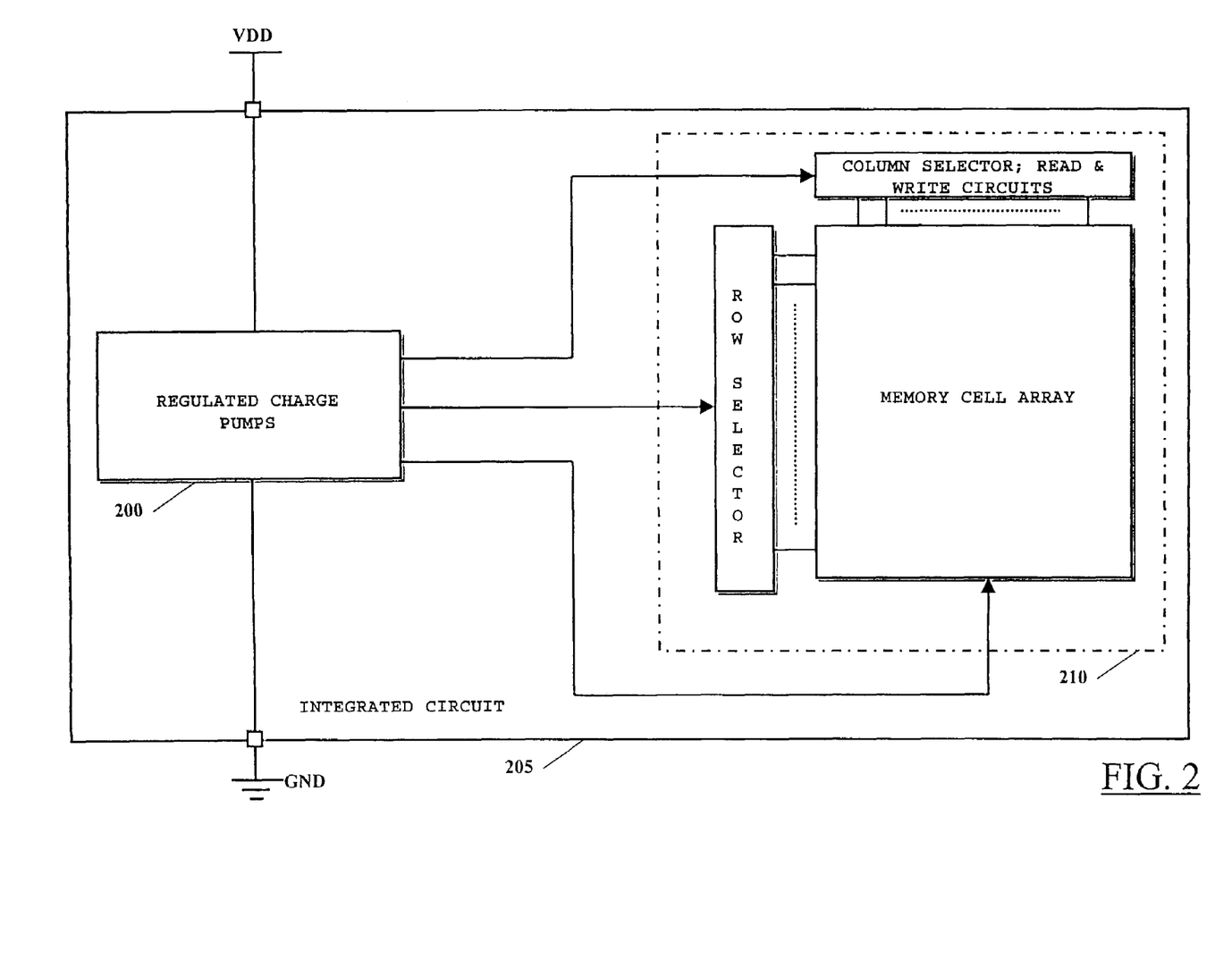
FIG. 2 shows an integrated circuit, particularly a semiconductor memory, including one or more charge pump voltage generators of the type shown in FIG. 1 according to an embodiment of the present invention.

With reference to the drawings, and particularly to FIG. 1, a regulated charge pump voltage generator is schematically shown in terms of the main functional blocks, and is globally identified by 100 according to an embodiment of the invention. The regulated charge pump 100 is for example part of an Integrated Circuit (IC). For example, referring to FIG. 2, one or more regulated charge pumps 200 of the type shown in FIG. 1 are integrated in a chip 205 of a semiconductor memory 210, particularly an electrically programmable or an electrically erasable and programmable non-volatile memory, such as an EPROM, an EEPROM, a Flash memory, for generating the electric potentials necessary for the operations of reading, writing and erasing the memory cells according to an embodiment of the invention.

The regulated charge pump voltage generator, in the following shortly referred to as regulated charge pump, 100 comprises a charge pump 105, made up of at least one stage, more typically a plurality of N stages connected in cascade between a supply voltage rail, in the shown example a metal line VDD distributing the supply voltage for the IC circuit blocks, and a charge pump output node OUT, at which a charge pump output voltage Vout is made available. The charge pump output voltage Vout is for example a relatively high positive or negative voltage, and, referring again to FIG. 2, is then delivered to the memory cells read/write/erase circuits for applying to the memory cells the electric potentials necessary to access the memory cells in reading, write data therein or erase previously written data.

In FIG. 1, the charge pump 105 has been schematically represented as being made up of a plurality of stages, each comprising a unidirectional charge transfer element, depicted as a diode, and a charge storage element, depicted as a capacitor.

The charge pump stages are driven by properly out-of-phase timing signals or, in jargon, phases globally identified as PHI. In greater detail, the phases are two-level signals switching between two voltage levels, typically the supply voltage VDD and the reference voltage GND; in each charge pump stage, the respective capacitor has a free plate that is driven by a respective one of the phases, and the phases driving adjacent stages are reciprocally out-of-phase. The diode in each stage enables the electric charge to be transferred from the capacitor of one stage to the capacitor of the following stage, preventing at the same time the charge from flowing back to the preceding stage.

The principle of operation of a charge pump is well known in the art and will not be described in further detail.

It is observed that the charge pump internal structure sketched in FIG. 1 is merely provided for recalling the charge pump principle of operation; in the practice, the structure of the charge pump stages is normally more complex; for example, the diodes are formed by means of transistors, local voltage boosts can be provided in each stage for properly driving the transistors, and so on. However, it is observed that the specific internal structure of the charge pump 105, and, namely, the specific structure of the stages thereof is not relevant to the present invention, and can vary depending on the designer preferences and/or on contingent needs and requirements. In general, any charge pump stage structure can be adopted.

The phases PHI are generated by a phase generator circuit 110; in particular, the phases PHI are generated synchronously with, and have a frequency same as or corresponding to a frequency of a phase generator clock signal CKpg. For example, assuming that the phases PHI includes two phase signals, the two phase signals are in phase opposition to each other.

The regulated charge pump comprises a charge pump output voltage regulator 115 that controls the operation of the charge pump 105 in a closed-loop way. In particular, the charge pump regulator 115 receives the charge pump output voltage Vout and a precisely-known, stable reference voltage Vbg, for example generated by a bandgap reference voltage generator 120. Based on a detected deviation of the charge pump output voltage from a target charge pump output voltage value, derived from the reference voltage Vbg, the charge pump regulator 115 acts on a base clock signal CK, received from a clock signal generator 125, having a predetermined, first frequency fa (e.g., equal to 10 MHz in normal operating conditions), so as to selectively transfer or block pulses of the base clock signal CK, thereby deriving from the base clock signal CK the phase generator clock signal CKpg having a second frequency fb that depends on the detected deviation of the charge pump output voltage from the target charge pump output voltage value. In particular, but not limitatively, the second frequency fb is a submultiple of the first frequency fa.

As shown in FIG. 1, the charge pump regulator 115 is adapted to work both in a normal operating condition and in a stand-by operating condition. In the context of the present description, by normal operation condition there is intended an operating condition that is not a stand-by operating condition, i.e., an operating condition wherein the charge pump may be requested to deliver a relatively high current. On the contrary, by stand-by condition there is intended a condition wherein the IC in which the regulated charge pump is integrated is substantially turned off, or put in a very-low current consumption state, but the charge pump is kept on, in order to reduce the settling time of the charge pump output voltage when leaving the stand-by condition to return to the normal operating condition. In particular, according to an embodiment of the present invention, the charge pump regulator 115 comprises a normal-operation regulator circuit 115-1 and a stand-by regulator circuit 115-2. The normal-operation regulator circuit 115-1 controls the charge pump during the normal operation, and is turned off when the IC is put in stand-by; the stand-by regulator circuit 115-2 takes on an active role in controlling the charge pump when the IC is put in stand-by.

Finally, in FIG. 1 a current generator Ileak pictorially represents a current leakage inherently associated with the charge pump output OUT.

Figure 3:
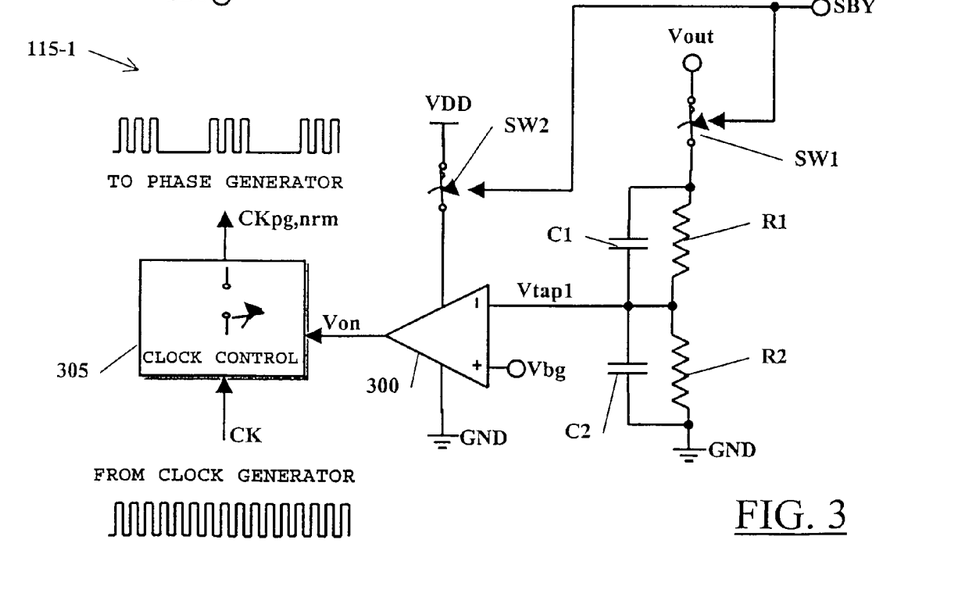
FIG. 3 is a schematic, functional block diagram of a part of the voltage regulation arrangement intended for the normal (i.e., non-stand-by) operation of the charge pump voltage generator according to an embodiment of the present invention.

Referring now to FIG. 3, the structure of the normal-operation regulator circuit 115-1 is schematically shown according to an embodiment of the invention. The charge pump output voltage Vout is fed to a resistive voltage divider comprised of two integrated resistors R1, R2 connected in series. A voltage Vtap1 equal to a fraction R2/(R1+R2) of the charge pump output voltage Vout is tapped out from the intermediate node of the voltage divider, and is fed to a first, inverting input of a voltage comparator 300. A second, non-inverting input of the comparator 300 receives the reference voltage Vbg. In order to compensate for effects caused by parasitics associated with the integrated resistors R1, R2, and for avoiding undesired dynamic undershoots in the voltage Vtap1, shunt capacitors C1, C2 are provided in parallel to the resistors R1, R2. The comparator 300 outputs a logic signal Von that is fed to a clock control circuit 305 (substantially, a gating circuit comprising for example a logic gate or an arrangement of logic gates). The clock control circuit 300 receives the clock signal CK and outputs the normal-operation phase generator clock signal CKpg, nrm. Depending on the logic state of the signal Von, the clock control circuit 300 either transmits to the output thereof or blocks pulses of the base clock signal CK. In particular, when the voltage Vtap1 is lower than the reference voltage Vbg (meaning that the charge pump output voltage Vout is lower than a target voltage value Vbg*(R1+R2)/R2=Vbg*(1+R1/R2)), the logic signal Von is high, and this causes the clock control circuit 305 to transmit the clock signal pulses to the output; on the contrary, when the voltage Vtap1 is higher than the reference voltage Vbg (meaning that the charge pump output voltage Vout is higher than the target voltage value), the logic signal Von is low, and this causes the clock control circuit 305 to block the clock signal pulses. As a consequence, the frequency of the phase generator clock signal CKpg,nrm is varied accordingly to the detected value of the charge pump output voltage Vout. In particular, after a transient, a dynamic equilibrium condition is reached in which the charge pump output voltage Vout is kept substantially equal to the desired target voltage value; in this condition, the regulator circuit 115-1 acts to keep the frequency of the phase generator clock signal CKpg, nrm at a value sufficient to compensate the decrease in the charge pump output voltage Vout due to the current delivered by the charge pump 105. The charge pump input-output characteristic in regulated conditions is:

$$Iout = \frac{fb}{N}((N+1) \cdot VDD - Vout)$$

where Iout is the current delivered by the charge pump 105 (sum of the current sunk by the load connected to the charge pump output OUT and the leakage current Ileak), and N is the number of charge pump stages.

The resistors R1, R2 of the voltage divider can either be constituted by integrated resistors or by transistors, for example MOSFETs.

Due to the presence of the resistive voltage divider, the normal-operation regulator circuit 115-1 exhibits a non-negligible current consumption, typically of the order of 5 to 10 μA, which is unacceptable in view of an operation in stand-by conditions. It is observed that, in order to limit the current consumption, the resistors R1, R2 should have a high resistance, but this would cause an unacceptable increase in the semiconductor area to be reserved to the charge pump regulator, as well as an unacceptable reduction in the regulator dynamic response.

For this reasons, the normal-operation regulator circuit 115-1 is turned off when the IC is put in stand-by conditions, as schematized by the switches SW1 and SW2, controlled by a stand-by control signal SBY, which causes the switches SW1 and SW2 to open when the stand-by condition is entered. In stand-by, the control of the charge pump 105 is thus entrusted to the stand-by regulator 115-2, which is activated upon entering in stand-by.

Figure 4:
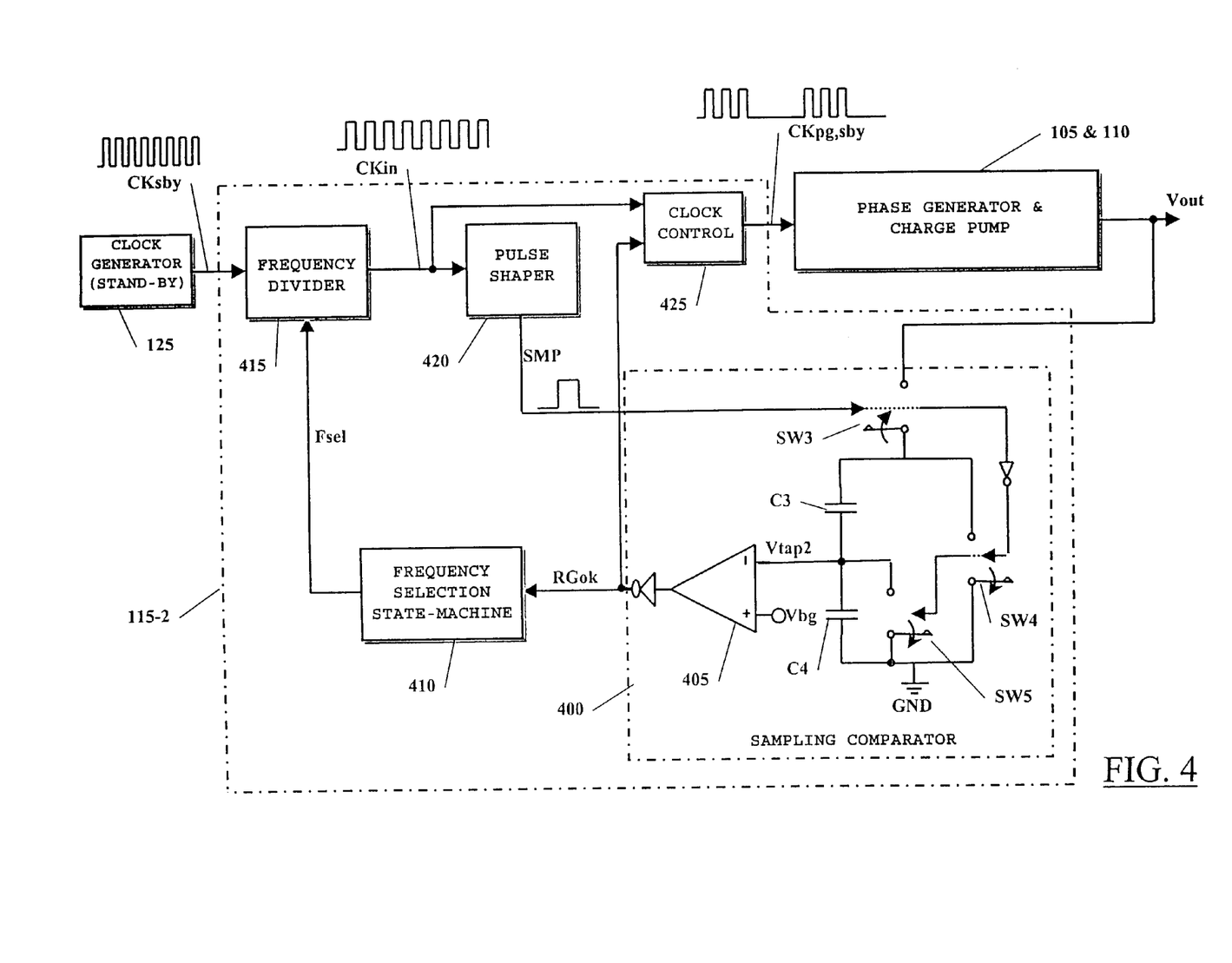
FIG. 4 is a schematic, functional block diagram of a stand-by regulator circuit of the output, voltage regulation arrangement, according to an embodiment of the present invention.

FIG. 4 schematically shows the main functional blocks of the stand-by regulator circuit 115-2, according to an embodiment of the present invention. Differently from the normal-operation regulator circuit 115-1, the stand-by regulator circuit 115-2 includes a sampling voltage comparator 400, particularly based on a capacitive voltage divider. Specifically, the charge pump output voltage Vout is applied, through a switch SW3 controlled by a sampling signal SMP, to a first plate of a first capacitor C3; a second plate of the first capacitor C3 is connected to a first plate of a second capacitor C4, having a second plate connected to the ground GND. First and second capacitor discharge paths are also provided, comprising respective switches SW4 and SW5, driven in counterphase compared to the switch SW3, so as to connect the first plate of the first capacitor C3 and the first plate of the second capacitor C4 to the ground GND.

In particular, during a sampling phase of the charge pump output signal (sampling pulse SMP), the switch SW3 is closed and the switches SW4 and SW5 are open; the charge pump output voltage Vout is thus applied to the first plate of the first capacitor C3. The capacitors C3 and C4 are charged by a charge current, sunk from the charge pump output. A voltage Vtap2 equal to a prescribed fraction C3/(C3+C4) of the charge pump output voltage Vout is tapped out from the intermediate node of the capacitive divider C3, C4 (i.e., the second plate of the first capacitor C3, connected to the first plate of the second capacitor C4), and is fed to a first, inverting input of a voltage comparator 405. A second, non-inverting input of the comparator 405 receives the reference voltage Vbg.

The comparator 405 outputs a logic signal whose logic state is indicative of the fact that the charge pump output voltage Vout is lower or higher than the desired target voltage value (Vbg*(1+C4/C3)).

Once the sampling phase (sampling pulse SMP) is terminated, the switch SW3 opens, and the switches SW4 and SW5 are closed; in this way, the capacitors C3 and C4 are discharged, and made ready for the next sampling phase. However, in one embodiment of the comparator 405 (or the inverter connected to its output) it holds its current output valve until the next sampling phase.

The voltage comparator 400 of the stand-by regulator 115-2 exhibits a very low current consumption, in particular much lower than that of the resistive-divider voltage comparator of the normal-operation regulator 115-1; in fact, the consumption of the sampling voltage comparator 400 is the sum of the consumption of the comparator 405 (corresponding to the comparator 300), plus the dynamic current absorbed by the capacitive divider C3, C4 during the sampling pulse SMP. It can thus be appreciated that the consumption of the sampling voltage comparator 400 depends on the sampling rate of the charge pump output voltage Vout the lower the sampling rate, the lower the consumption of the voltage comparator 400, and thus the lower the consumption of the stand-by regulator 115-2. By choosing a relatively low sampling rate, the consumption of the sampling voltage comparator can be kept low.

On the other hand, if the sampling rate of the charge pump output voltage Vout is too low, the regulation of the charge pump output voltage Vout against variations due to current leakages becomes poor; in this respect, the higher the sampling rate, the better the regulation of the charge pump output voltage Vout, but the consequent increased current consumption of the sampling voltage comparator 400 adds up to the current leakages, and thus causes a faster degradation of the charge pump output voltage Vout.

Thus, the stand-by regulator circuit 115-2 and, particularly, the sampling voltage comparator 400 and the sampling rate thereof, should be dimensioned on the basis of the leakage current Ileak. Unfortunately, the real-life value of this quantity is hardly predictable in the design phase, because it largely depends on many factors, such as the IC working temperature and the manufacturing technology.

In order to overcome the problems discussed above, according to an embodiment of the present invention there is provided a self-adjustable sampling rate, i.e., a sampling rate that varies according to the level of leakage.

In an embodiment of the present invention, the adjustment of the sampling rate is based on an analysis of the evolution in time of the charge pump output voltage Vout in the stand-by operating condition.

In particular, in an embodiment of the present invention, the adjustment of the sampling rate is performed counting the times that the logic signal outputted by the comparator 405 is high/low in successive sampling phases.

A logic signal RGok, derived from the output signal of the comparator 405 by means of a logic inversion, is fed to a sequential logic unit 410, particularly a state machine. Based on the previous and present states of the logic signal RGok, following a prescribed operation logic, an example of which will be described in greater detail in the following, the state machine 410 establishes suitable control codes Fsel for a frequency divider 415. The frequency divider 415 receives a base clock signal of frequency fo, for example the clock signal CK of frequency fa generated by the clock generator 125, or a stand-by clock signal CKsby, generated by a stand-by clock generator, having a different, particularly a lower frequency fc (e.g., 1 MHz). Responsive to the control code Fsel provided by the state machine 410, the frequency divider 415 operates a frequency division of the frequency fo for a prescribed division factor, that depends on the control code Fsel received. A frequency down-scaled internal clock signal CKin is thus produced by the frequency divider 415, having a frequency fin which is a sub-multiple of the frequency fo. The internal clock signal CKin is then fed to a pulse shaper circuit 420, which generates, synchronously with the pulses of the internal clock signal CKin, for example at each rising edge thereof, sampling pulses SMP of prescribed time duration for the sampling voltage comparator 400.

The internal clock signal CKin is also fed to a clock control circuit 425, similar to the clock control circuit 305 in the normal-operation regulator 115-1. The clock control circuit 425 also receives the logic output RGok, and outputs a stand-by phase generator clock signal CKpg,sby which is fed to the phase generator 110. Depending on the logic state of the signal RGok, the clock control circuit 425 either transmits to the output thereof or blocks the pulses of the internal clock signal CKint.

Figure 5:
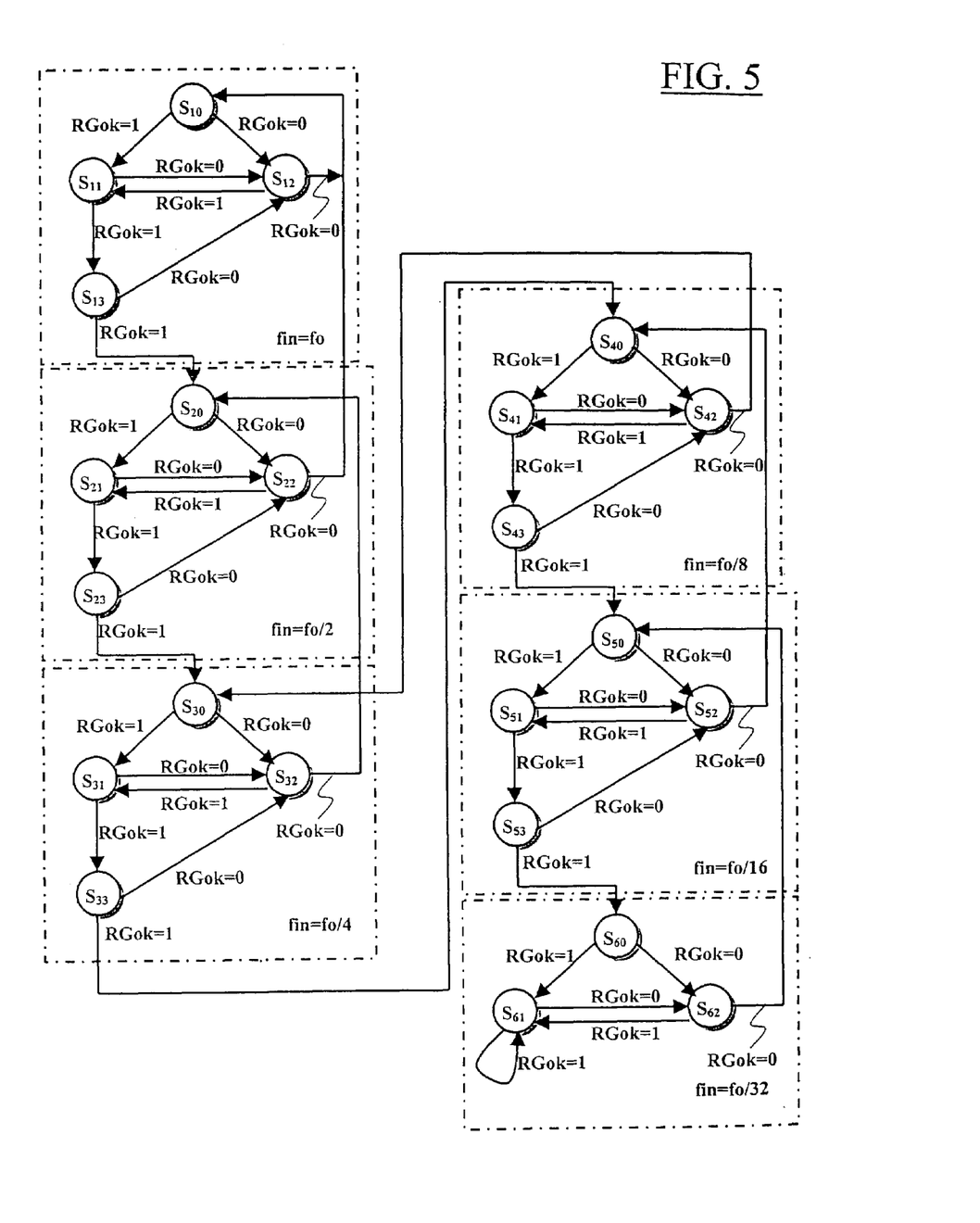
FIG. 5 is a state-transition diagram illustrating the operation of a state machine included in the stand-by regulator circuit of FIG. 4 according to an embodiment of the present invention.

Reference is now made to FIG. 5, wherein there is depicted a state-transition diagram illustrating the operation of the state machine 410, in one embodiment of the present invention. For each frequency division factor to be applied by the frequency divider, a respective subset of states is provided. In the exemplary embodiment described herein, six different subsets of states $S_{10}$-$S_{14}$, $S_{20}$-$S_{24}$, $S_{30}$-$S_{34}$, $S_{40}$-$S_{44}$, $S_{50}$-$S_{54}$ and $S_{60}$-$S_{63}$ are provided, corresponding to frequency division factors equal to 1 (fin=fo), 2 (fin=fo/2), 4 (fin=fo/4), 8 (fin=fo/8), 16 (fin=fo/16) and 32 (fin=fo/32), respectively.

From the state-transition diagram of FIG. 5, it can be appreciated that if the stand-by regulator circuit 115-2 is, at a given time, operating at a given sampling rate, e.g. equal to fo/4, such a sampling rate is kept unchanged as long as either one of the following two conditions is satisfied:

a) the logic output signal RGok of the comparator 405 is alternately high and low in successive sampling phases (meaning that the charge pump output voltage Vout has a value oscillating around the target voltage value, that is, a dynamic equilibrium has been reached); or b) the logic output signal RGok of the comparator 405 is high twice and low once.

If either of these two conditions is satisfied, the charge pump output voltage Vout has a value oscillating around the target voltage value, that is, a dynamic equilibrium has been reached. In this case, supposing that the current sampling rate is fo/4, the state machine continuously cycles among the states $S_{31}$ and $S_{32}$, or $S_{31}$, $S_{32}$ and $S_{33}$.

On the contrary, if the logic output signal RGok remains high for three consecutive sampling phases (a situation assumed to be indicative of too high a sampling rate), the sampling rate is decreased, in particular it is halved (referring again to the example of a current sampling rate equal to fo/4, the state machine 410 goes from the state $S_{33}$ to the state $S_{40}$, the first state in the next subset of states $S_{40}$-$S_{44}$ to which there corresponds a frequency division factor equal to 8).

If instead the logic output signal RGok remains low for two consecutive sampling phases (a situation assumed to be indicative of too low a sampling rate, not sufficient for compensating the leakages), the sampling rate is increased, in particular it is doubled (referring again to the example of a current sampling rate equal to fo/4, the state machine goes from the state $S_{32}$ to the state $S_{20}$, the first state in the previous subset of states $S_{20}$-$S_{24}$ to which there corresponds a frequency division factor equal to 2).

It is observed that in the first subset of states $S_{10}$-$S_{14}$, a jump from the state $S_{12}$ to the state $S_{10}$ replaces the jump from the state $S_{22}$, $S_{32}$, $S_{42}$, $S_{52}$, $S_{62}$ to the first state in the previous subset of state (1 is the lowest frequency division factor, in the shown embodiment), and in the last subset of states $S_{60}$-$S_{62}$ the fourth state is missing, and there is provided a loop around the state $S_{61}$ (32 is the highest frequency division factor, in the shown embodiment).

It is pointed out that the number of subset of states may vary depending on the number of different frequency division factors (for example, if only four division factors 1, 2, 4 and 8 were provided for, only four subset of states would be necessary). Similarly, the number of states in each subset of states may vary, depending on the patterns chosen for the logic output signal RGok and made to correspond to a decrease, maintenance as such or increase of the sampling rate.

When the stand-by condition is entered, the normal-operation regulator circuit 115-1 is deactivated, the clock signal generator 125 is caused to generate the lower-frequency stand-by base clock signal CKsby, and the stand-by regulator 115-2 is activated, the state machine 410 starts from an initial state, corresponding to a prescribed control code Fsel for the frequency divider, which in turn corresponds to a prescribed initial frequency division factor. For example, the initial state may be the state $S_{10}$, corresponding to a frequency division factor equal to 1, or, preferably, the starting state may be the starting state of an intermediate subset of states, for example the state $S_{30}$, corresponding to a division factor equal to 4. From this state, depending on the detected value of the charge pump output Vout, sampled at a rate determined by the initial frequency division factor, the state machine 410 evolves, causing the frequency division factor to vary and thus in the sampling rate, until an equilibrium condition is reached in which the sampling rate is the minimum admissible sampling rate (and thus, the minimum current consumption) that allows for compensating the decrease in the charge pump output voltage Vout due to the leakage.

Depending on the current logic state of the output signal RGok, the clock control circuit 425 enables or not the supply of clock pulses of the internal clock signal CKint to the phase generator 110: when the signal RGok is low (meaning that Vtap2<Vbg), the clock control circuit 425 let the pulses of the internal clock signal CKint pass and be fed to the phase generator 110, so that the charge pump 105 pumps electric charge from the supply voltage rail to the output. When, instead, the signal RGok is high (meaning that Vtap2>Vbg), the clock control circuit 425 blocks the pulses of the internal clock signal CKint, and the charge pump 105 does not pump electric charge.

It is observed that, in principle, nothing prevents from using a self-adjusting sampling rate, sampling voltage comparator regulator similar to the stand-by regulator 115-2 also for controlling the charge pump during the normal operating conditions, in place of the regulator 115-1.

Although the present invention has been disclosed and described by way of some embodiments, it is apparent to those skilled in the art that several modifications to the described embodiments, as well as other embodiments of the present invention are possible without departing from the scope thereof. For example, the IC 205 of FIG. 2 may be incorporated into an electronic system such as a computer system.

What is claimed is:

1. A regulator circuit for a charge pump voltage generator, comprising:
   sampling means for sampling a charge pump output voltage at a sampling rate, the sampling means providing samples of the charge pump output voltage;
   a voltage comparator means for performing a voltage comparison between the samples of the charge pump output voltage and a reference voltage;
   means responsive to the result of the voltage comparison of said voltage comparator means for conditioning a clocking of the charge pump voltage generator; and
   sampling rate control means for controlling the sampling rate responsive to the result of the voltage comparison.

2. The regulator circuit according to claim 1, in which said voltage comparator means include hold means for holding a sampled charge pump output voltage.

3. The regulator circuit according to claim 2, in which said hold means include a capacitive voltage divider.

4. A regulator circuit for a charge pump voltage generator, comprising a voltage comparator means for performing a voltage comparison between a charge pump output voltage and a reference voltage, and means responsive to said voltage comparator means for conditioning a charge pump clocking to the result of the voltage comparison, such that said voltage comparator means includes sampling means for sampling the charge pump output voltage at a sampling rate, and that sampling rate control means are provided, responsive to said voltage comparison, for controlling the sampling rate according to the result of the voltage comparison, and wherein said sampling rate control means include a sequential logic unit responsive to an output of the voltage comparator means, and frequency divider means having a variable division factor controlled by the sequential logic unit, for applying the frequency division factor to a base clock signal to obtain said sampling rate.

5. The regulator circuit according to claim 4, in which said sequential logic unit comprises a state machine.

6. A voltage regulation arrangement for a charge pump voltage generator, comprising a first voltage regulator and a second voltage regulator, for regulating a charge pump output voltage in a first operating condition, and a second voltage regulator, for regulating a charge pump output voltage in a second operating condition, wherein the second voltage regulator is realized according to claim 1.

7. The voltage regulation arrangement according to claim 6, in which said second operating condition is a reduced-consumption condition compared to the first operating conditions, the first voltage regulator being deactivated in the operating condition.

8. The voltage regulation arrangement according to claim 6, in which the first voltage regulator comprises respective voltage comparator means for performing a voltage comparison between a charge pump output voltage and the reference voltage, and charge pump clocking conditioning means responsive to said voltage comparator means of the first voltage regulator for conditioning a charge pump clocking to the result of the voltage comparison, the voltage comparator means of the first voltage regulator comprising a resistive voltage divider for down-scaling the charge pump output voltage.

9. An integrated circuit including a charge pump voltage generator and a charge pump regulator circuit according to claim 1.

10. An integrated circuit including at least one charge pump voltage generator and a charge-pump voltage regulation arrangement according to claim 6.

11. A method of regulating an output voltage of a charge-pump voltage generator, comprising:
   sampling the output voltage at a sampling frequency to generate samples of the output voltage;
   comparing the samples of the output voltage to a reference voltage; and
   varying the sampling frequency according to the result of comparing the samples of the output voltages to the reference voltage.

12. A voltage-boost circuit, comprising:
   a charge pump operable to generate a boosted voltage on an output node that is coupled to a load;
   a first regulator coupled to the charge pump and operable to regulate the boosted voltage while the load is in a first operating mode; and
   a second regulator coupled to the charge pump and operable to regulate the boosted voltage while the load is in a second operating mode by adjusting a sampling rate at which the boosted voltage is sampled.

13. The voltage-boost circuit of claim 12 wherein:
   while in the first operating mode, the load draws from the output node an operating current; and
   while in the second operating mode, the load draws from the output node a standby current that is smaller than the operating current.

14. The voltage-boost circuit of claim 12 wherein the first regulator consumes more power while operating than the second regulator consumes while operating.

15. The voltage-boost circuit of claim 12 wherein:
   the first regulator is operable to drive the charge pump with a first clock having a first frequency; and
   the second regulator is operable to drive the charge pump with a second clock having a second frequency that is lower than the first frequency.

16. An integrated circuit, comprising:
   a charge pump operable to generate a boosted voltage on an output node;
   a first regulator coupled to the charge pump and operable to regulate the boosted voltage while the voltage-boost circuit is in a first operating mode; and
   a second regulator coupled to the charge pump and operable to regulate the boosted voltage while the voltage-boost circuit is in a second operating mode by adjusting a sampling rate at which the boosted voltage is sampled.

17. An electronic system, comprising:
   integrated circuit, comprising,
   a charge pump operable to generate a boosted voltage on an output node,
   a first regulator coupled to the charge pump and operable to regulate the boosted voltage while the voltage-boost circuit is in a first operating mode, and
   a second regulator coupled to the charge pump and operable to regulate the boosted voltage while the voltage-boost circuit is in a second operating mode by adjusting a sampling rate at which the boosted voltage is sampled.

18. A method, comprising:
   regulating a boosted voltage generated by a charge pump with a first regulator during a first operating mode; and
   regulating the boosted voltage with a second regulator during a second operating mode by adjusting a sampling rate at which the boosted voltage is sampled.

19. The method of claim 18 wherein:
   regulating the boosted voltage during the first operating mode comprises clocking the charge pump at a first frequency; and
   regulating the boosted voltage during the second operating mode comprises clocking the charge pump at a second frequency.

20. A boosted-voltage regulator, comprising:
   a comparator operable to compare a reference voltage to a sample of a boosted voltage generated by a charge pump; and
   a clocking circuit coupled to the comparator and operable to select a clock frequency based on the comparison, to generate a clock signal at the selected frequency, and to couple the clock signal to the charge pump based on the comparison and to couple the clock signal to the comparator to adjust a rate at which the comparator samples the boosted voltage.

21. The boosted-voltage regulator of claim 20, further comprising a sampler coupled to the comparator and operable to generate the sample of the boosted voltage.

22. An integrated circuit, comprising:
   a charge pump operable to generate a boosted voltage;
   a sampler coupled to the charge pump and operable to generate a sample of the boosted voltage;
   a comparator coupled to the sampler and operable to compare the sample to a reference voltage; and
   a clocking circuit coupled to the comparator, sampler, and to the charge pump and operable to select a clock frequency based on the comparison, to generate a clock signal at the selected frequency, and to couple the clock signal to the charge pump based on the comparison and to couple the clock signal to the sampler to adjust a rate at which the comparator samples the boosted voltage.

23. The integrated circuit of claim 22 wherein the boosted voltage comprises a positive voltage.

24. The integrated circuit of claim 22 wherein the boosted voltage comprises a negative voltage.

25. An electronic system, comprising:
   an integrated circuit, comprising,
   a charge pump operable to generate a boosted voltage;
   a sampler coupled to the charge pump and operable to generate a sample of the boosted voltage,
   a comparator coupled to the sampler and operable to compare the sample to a reference voltage, and
   a clocking circuit coupled to the comparator, sampler, and to the charge pump and operable to select a clock frequency based on the comparison, to generate a clock signal at the selected frequency, and to couple the clock signal to the charge pump based on the comparison and to couple the clock signal to the sampler to adjust a rate at which the comparator samples the boosted voltage.

26. A method, comprising:
   sampling a boosted voltage generated by a charge pump;
   comparing a reference voltage to the boosted voltage;
   selecting a clock frequency based on the comparing;
   clocking the charge pump at the selected clock frequency based on the comparing; and
   varying a rate of the sampling as a function of the clock frequency.

27. The method of claim 26, further comprising:
   dividing the boosted voltage; and
   wherein comparing the reference voltage comprises comparing the reference voltage to the divided boosted voltage.

28. The method of claim 26 wherein clocking the charge pump comprises:
   coupling a clock signal to the charge pump if an absolute value of the boosted voltage is less than an absolute value of the reference voltage; and uncoupling the clock signal from the charge pump if the absolute value of the boosted voltage is greater than the absolute value of the reference voltage.

29. The method of claim 26 wherein:
comparing the reference voltage comprises comparing the reference voltage to samples of the boosted voltage at the selected clock frequency; and
selecting the clock frequency comprises,
  increasing the clock frequency if fewer than a first fraction of the samples have absolute values greater than an absolute value of the reference voltage, and
  decreasing the clock frequency if more than a second fraction of the samples have absolute values greater than the absolute value of the reference voltage.

30. A method, comprising:
comparing a reference voltage to a boosted voltage generated by a charge pump;
selecting a clock frequency based on the comparing;
clocking the charge pump at the selected clock frequency based on the comparing, and wherein,
  comparing the reference voltage further comprises comparing the reference voltage to samples of the boosted voltage at the selected clock frequency; and
  selecting the clock frequency further comprises holding the clock frequency at a current value if more than a first fraction of samples and fewer than a second fraction of samples have absolute values greater than the absolute value of the reference voltage.

31. The method of claim 30 wherein:
comparing the reference voltage comprises comparing the reference voltage to samples of the boosted voltage at the selected clock frequency; and
selecting the clock frequency comprises,
  increasing the clock frequency if fewer than one half of the samples have absolute values greater than an absolute value of the reference voltage, and
  decreasing the clock frequency if more than two thirds of the samples have absolute values greater than the absolute value of the reference voltage.

32. The method of claim 30 wherein:
comparing the reference voltage comprises comparing the reference voltage to samples of the boosted voltage at the selected clock frequency; and
selecting the clock frequency comprises,
  increasing the clock frequency if more than a first number of consecutive samples have absolute values less than an absolute value of the reference voltage, and
  decreasing the clock frequency if more than a second number of consecutive samples have absolute values greater than the absolute value of the reference voltage.

33. The method of claim 30 wherein:
comparing the reference voltage comprises comparing the reference voltage to samples of the boosted voltage at the selected clock frequency; and
selecting the clock frequency comprises holding the clock frequency at a current value if more than a first number of consecutive samples have absolute values less than an absolute value of the reference voltage and fewer than a second number of samples have absolute values greater than the absolute value of the reference voltage.

34. The method of claim 30 wherein:
comparing the reference voltage comprises comparing the reference voltage to samples of the boosted voltage at the selected clock frequency; and
selecting the clock frequency comprises,
  increasing the clock frequency if multiple consecutive samples have absolute values less than an absolute value of the reference voltage, and
  decreasing the clock frequency if more than two consecutive samples have absolute values greater than the absolute value of the reference voltage.

* * * * *